(12) United States Patent
Tanae et al.

(10) Patent No.: US 7,597,370 B2
(45) Date of Patent: Oct. 6, 2009

(54) CARRYING UNIT

(75) Inventors: Toshikazu Tanae, Tokyo (JP); Yukio Kaneko, Tokyo (JP)

(73) Assignee: Koganei Corporation, Tokyo (JO)

( * ) Notice: Subject to any disclaimer, the term of this patent is extended or adjusted under 35 U.S.C. 154(b) by 0 days.

(21) Appl. No.: 11/319,126

(22) Filed: Dec. 27, 2005

(65) Prior Publication Data
US 2006/0138793 A1    Jun. 29, 2006

(30) Foreign Application Priority Data
Dec. 28, 2004   (JP) ............................. 2004-380657

(51) Int. Cl.
*B25J 15/06* (2006.01)
(52) U.S. Cl. .................................. 294/64.3
(58) Field of Classification Search ............... 294/64.1, 294/65, 64.3; 901/40
See application file for complete search history.

(56) References Cited

U.S. PATENT DOCUMENTS

| | | | | |
|---|---|---|---|---|
| 1,222,535 | A * | 4/1917 | Crum | 294/65 |
| 3,993,301 | A | 11/1976 | Vits | |
| 4,593,947 | A * | 6/1986 | Yocum | 294/64.1 |
| 4,736,749 | A * | 4/1988 | Lundback | 600/387 |
| 4,858,976 | A * | 8/1989 | Stoll | 294/64.1 |
| 4,921,520 | A | 5/1990 | Carlomagno | |
| 5,169,196 | A | 12/1992 | Safabakhsh | |
| 5,636,887 | A * | 6/1997 | Petropoulos et al. | 294/64.2 |
| 5,800,646 | A * | 9/1998 | Syori et al. | 156/64 |
| 6,043,458 | A * | 3/2000 | Fortune | 294/64.1 |
| 6,437,560 | B1 * | 8/2002 | Kalb | 414/752.1 |
| 7,398,735 | B1 * | 7/2008 | Sunderland | 104/10 |
| 7,452,016 | B2 * | 11/2008 | Tanae | 294/64.3 |

FOREIGN PATENT DOCUMENTS

| | | | | |
|---|---|---|---|---|
| JP | 63201028 | | 8/1988 | |
| JP | 402292152 | * | 12/1990 | 294/64.1 |
| JP | 10-181879 | | 7/1998 | |
| JP | 3443375 | | 4/2001 | |
| JP | 2004-217252 | * | 8/2007 | |

OTHER PUBLICATIONS

European Search Report dated Mar. 20, 2006.

* cited by examiner

*Primary Examiner*—Paul T Chin
(74) *Attorney, Agent, or Firm*—McCormick, Paulding & Huber LLP

(57) ABSTRACT

A carrying unit is capable of changing the holding force of a carried object, suppressing the deformation amount of a carried object held by suction and dropping the carried object quickly at a predetermined place. A carrying unit has a workpiece holding face opposing a carried object and a carrying head equipped with a concave portion having an air guide face gently continued from a bottom face to a work holding face. A cylindrical nozzle, which forms a slit for discharging air between the carrying head and the bottom face in order to discharge positive pressure air toward the air guide face from that slit, is mounted on the carrying head such that it projects from the bottom face. A central portion of the cylindrical nozzle serves as a vertical nozzle having a vertical hole, which is open substantially in a vertical direction with respect to the carried object for supplying positive pressure or negative pressure air to the carried object, and a flat portion perpendicular to the vertical hole.

11 Claims, 5 Drawing Sheets

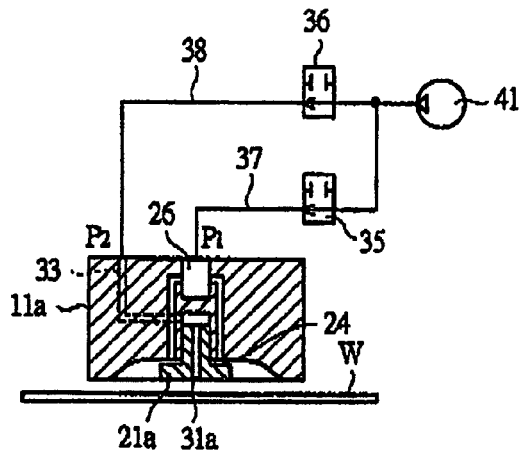

Suction time : The opening/
 closing valve 35 : ON
Carrying time : The opening/
 closing valve 35 and 36 : ON

FIG. 5A

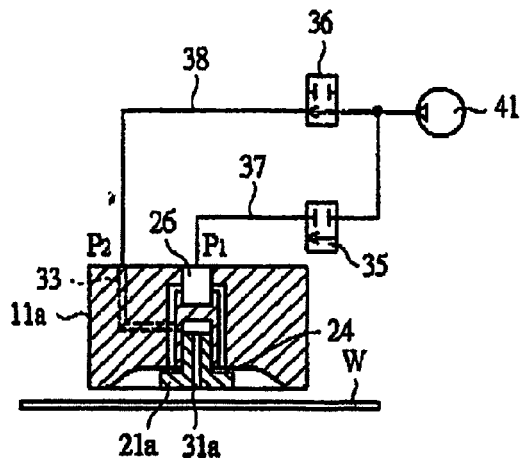

Suction time : The opening/
 closing valve 35 : ON
Carrying time : The opening/
 closing valve 35 : OFF
 The opening/
 closing valve 36 : ON

FIG. 5B

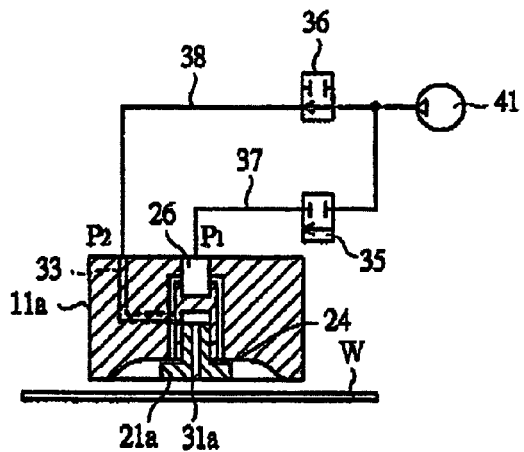

After carrying
 The opening/closing valve 35 : OFF
 The opening/closing valve 36 : ON

FIG. 5C

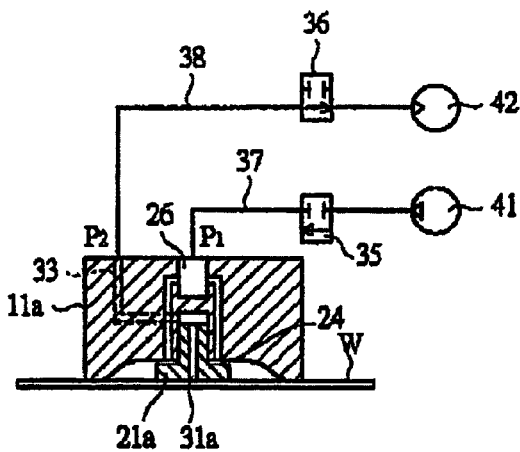

Suction time : The opening/
 closing valve 35 : ON
 OR : The opening/
 closing valve 35 and 36 : ON
Carrying time : The opening/
 closing valve 35 : OFF
 The opening/
 closing valve 36 : ON
 (Vacuum contact)

FIG. 5D

CARRYING UNIT

CROSS-REFERENCED TO RELATED APPLICATIONS

Applicant hereby claims foreign priority benefits under U.S.C. §119 from Japanese Patent Application No. 2004-380657 filed on Dec. 28, 2004, the contents of which are incorporated by reference herein.

BACKGROUND OF THE INVENTION

The present invention relates to a carrying unit for carrying, for example, a sheet-like workpiece while holding it as a carried object.

The carrying unit for carrying a workpiece such as a semiconductor wafer while holding it as a carried object from a workpiece supporting position to a processing position includes a type which carries the carried object by sucking it by vacuum and a type which carries the carried object while holding it in a non-contact condition without keeping the carried object in contact with a carrying head.

As the former type, vacuum suction type is available and as the latter type, a non-contact carrying unit is available, which as described in Patent document 1(Japanese Patent Laid-open Publication No. 10-181879), has a carrying head in which a concave portion is formed opposing the carried object while a nozzle forming a ring-like slit for discharging positive pressure air along an air guide face formed in the concave portion is mounted in the concave portion. In this type of the carrying unit, air layer is formed on the front end face of the carrying head with air discharged from the slit, so as to create negative pressure condition in front of the front end face of the carrying head, whereby sucking the carried object and holding the carried object via the air layer. Suction holding force for the carried object depends on flow velocity and flow amount of airflow along the front end face of the carrying head.

In case of the above-described non-contact type carrying unit, if the gap of the slit is constant, it is necessary to change the flow velocity and flow amount of air by means of a pressure control valve or a flow amount control valve in order to change the suction holding force. In order to attract a carried object to the carrying head by creating negative pressure condition in front of the front end face of the carrying head, a large amount of air needs to be discharged from the slit. After the carried object is held by the carrying head via the air layer, the carried object can be held by a smaller amount of discharged air than that discharged for attracting the carried object. Such a non-contact type carrying unit is so constructed that a specified amount of air is always discharged from the slit and therefore, a large amount of air needs to be discharged in carrying process.

Positive pressure air flows outward in the diameter direction along the front end face of the carrying head from the ring-like slit, so that negative pressure condition is created. If the carried object is a member easy to deform like an ultra thin workpiece, the carried object is deformed, which is a problem to be solved.

Further, when a carried object, after carried through suction process and carrying processes, is loaded on a predetermined place, supply of positive pressure air to the slit is stopped to allow the carried object to drop naturally by its own weight. If it takes long to drop the carried object, productivity of such a product goes down, which is another problem to be solved.

SUMMARY OF THE INVENTION

An object of the present invention is to provide a carrying unit capable of changing its holding force for a carried object.

Another object of the present invention is to provide a carrying unit capable of suppressing the deformation amount of a carried object held by suction.

Still another object of the present invention is to provide a carrying unit capable of dropping the carried object quickly at a predetermined place such as a processing position.

A carrying unit comprising is a carrying head in which a workpiece holding face opposing a carried object and a concave portion dented by cutting to the side of a rear end with respect to the work holding face and for carrying the carried object in a holding condition; a cylindrical nozzle attached to the carrying head such that it projects from the bottom face of the concave portion so as to form a ring-like air discharging slit between the bottom face and the cylindrical nozzle, and to discharge positive pressure air from the ring-like slit; and a vertical nozzle having a vertical hole open substantially in the vertical direction with respect to the carried object in order to supply positive or negative pressure air to the carried object, and a vertical nozzle having a flat portion at right angle to the vertical hole.

The carrying unit wherein the concave portion has an air guide face continued gently from the bottom face to the workpiece holding face and discharges positive pressure air from the slit toward the air guide face.

The carrying unit, wherein the vertical hole is formed in the center of the cylindrical nozzle so that the central portion of the cylindrical nozzle acts as the vertical nozzle.

The carrying unit wherein a plurality of the carrying heads is provided on a holder plate and a plurality of the vertical nozzles are provided in the holder plate.

The carrying unit wherein, with the carrying head disposed above the carried object such that the work holding face opposes the carried object, the carried object is carried in conditions that it is held via airflow between the work holding face and the carried object and airflow between the flat portion and the carried object by discharging positive pressure air from the slit to suck the carried object toward the work holding face and then discharging positive pressure air from the vertical hole.

The carrying unit wherein, with the carrying head disposed above the carried object such that the work holding face opposes the carried object, the carried object is carried in conditions that it is held via airflow between the flat portion and the carried object by discharging positive pressure air form the slit to suck the carried object toward the work holding face and after that, supplying positive pressure air to the vertical hole while stopping the discharge of the positive pressure air from the slit.

The carrying unit wherein, with the carrying head disposed above the carried object such that the work holding face opposes the carried object, the carried object is carried in conditions that it is held by the work holding face by suction by discharging positive pressure air form the slit to suck the carried object toward the work holding face and after that, supplying negative pressure to the vertical hole while stopping the discharge of the positive pressure air from the slit.

The carrying unit wherein after the carried object is carried by the carrying head, the carried object is dropped by stopping supply of positive pressure air from the slit while discharging positive pressure air from the vertical hole.

According to the present invention, in addition to compressed air discharged from the slit, the compressed air is supplied from a vertical hole in conditions that the carried object is sucked and taken near, so that discharged air flows radially to the outer periphery and a diffuser is created. As a result, because of a principle called Bernoulli's chuck, the holding force for the carried object can be increased. When carrying the carried object up to a predetermined position such as a processing position after it is taken near to the carrying head by suction, the air flow consumption can be reduced by holding the carried object with only air discharged from the vertical hole.

According to the present invention, air flow layer is created in the flat portion of the cylindrical nozzle by supplying air from the vertical hole also in addition to air discharged from the slit. As a consequence, as compared to a case where no air is supplied from the vertical hole, the carried object can be held in a nearly flat condition while suppressing the deformation amount of the carried object.

According to the present invention, by discharging air intermittently from the vertical hole with the air supply from the slit stopped, the carried object can be dropped more quickly than a case where the carried object is dropped naturally by its own weight.

According to the present invention, by supplying negative pressure air to the vertical hole after the carried object is sucked by supplying air from the slit, this carrying unit can be used as a contact type carrying unit, namely, a vacuum suction pad.

DESCRIPTION OF THE DRAWINGS

Hereinafter, the preferred embodiments of the present invention will be described in detail with reference to the accompanying drawings.

FIGS. 5A to 5D are schematic views showing a style in which the carrying head is disposed facing downward so as to carry the carried object.

DESCRIPTION OF THE PREFERRED EMBODIMENTS

Figure 1:
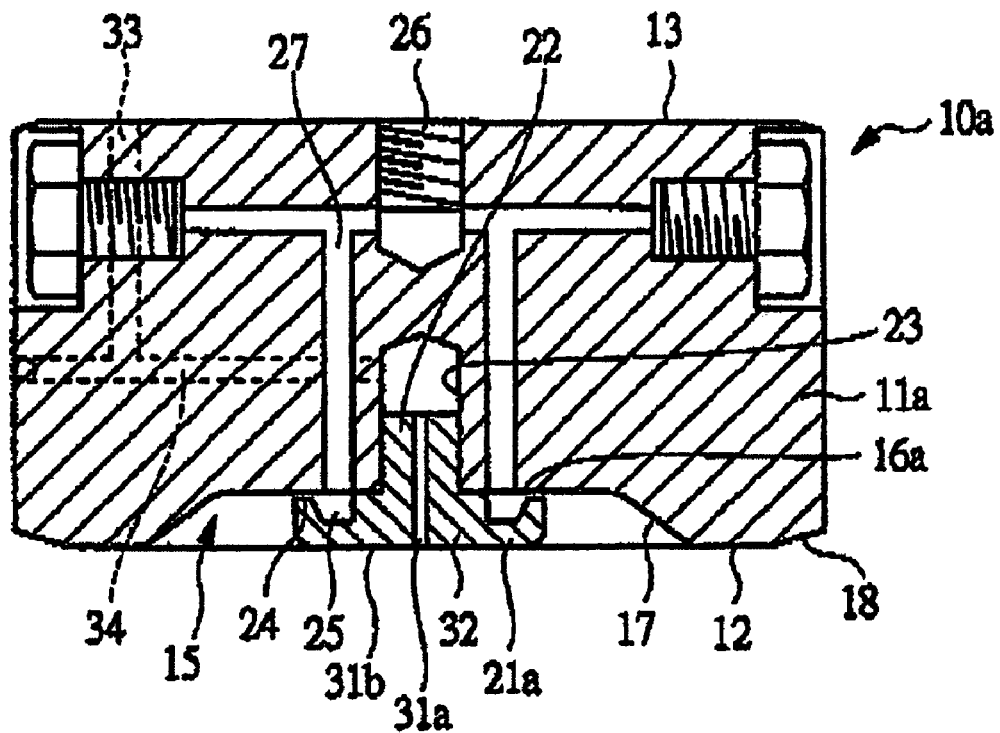
FIG. 1 is a sectional view showing a carrying unit according to an embodiment of the present invention.
Figure 2:
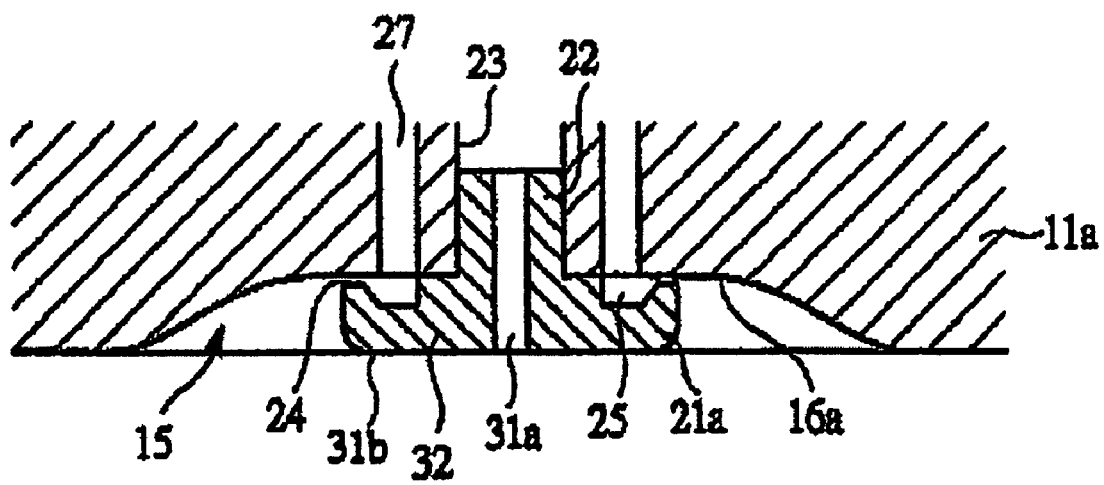
FIG. 2 is an enlarged sectional view showing part of FIG. 1.
Figure 3:
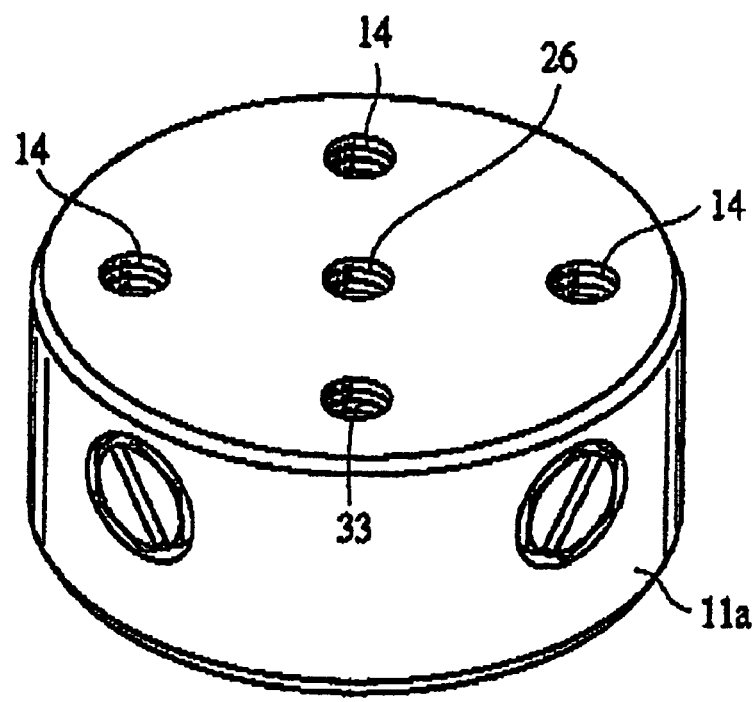
FIG. 3 is a perspective view showing the top face of FIG. 1.

A carrying unit 10a has a carrying head 11a composed of a member whose outer periphery is circular and a workpiece holding face 12 is provided on the front end face of the carrying head 11a while a mounting face 13 is provided on the rear end face. Bolts are to be screwed into bolt tightening holes 14 formed in the carrying head 11a such that they are open to the mounting face 13 as shown in FIG. 3 and the carrying head 11a is mounted on a moving member such as a robot arm with bolts and driven vertically or horizontally by means of the moving member.

Figure 4:
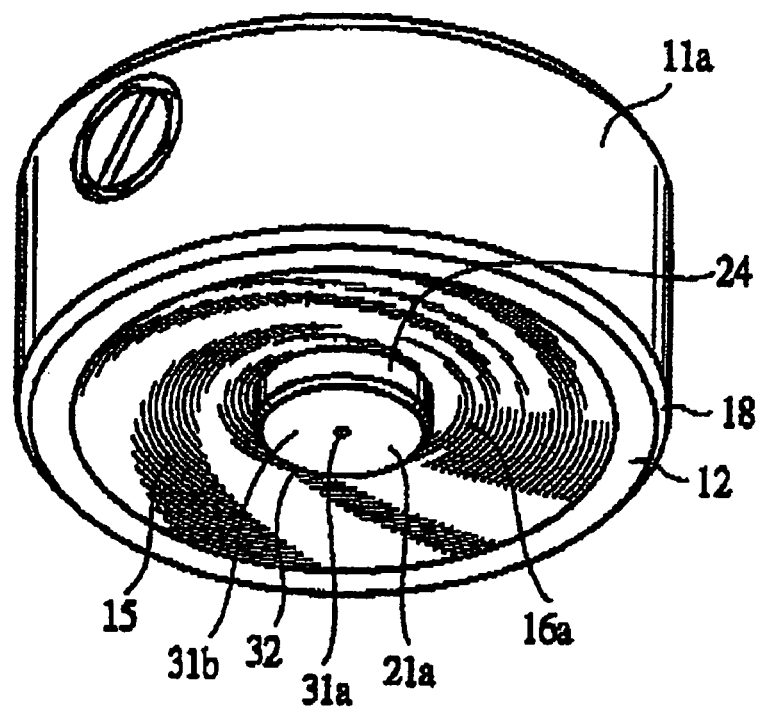
FIG. 4 is a perspective view showing the bottom face of FIG. 1.

A concave portion 15 is formed in the front end face of the carrying head 11a such that it is dented to the side of the rear end relative to the workpiece holding face 12 by cutting out. This concave portion 15 has a bottom face 16a and an air guide face 17 which is continuous mildly from the bottom face 16a to the workpiece holding face 12. The air guide face 17 is of stream line type, comprised of a portion substantially flush with the bottom face 16a, a portion coming out gradually toward the workpiece holding face 12 and a portion substantially flush with the workpiece holding face 12. The workpiece holding face 12 is topmost end face of the carrying head 11a and as shown in FIG. 4, directed substantially in the diameter direction with respect to a central axis of the carrying head 11a and has a predetermined dimension in the diameter direction. A tapered face 18 is formed between the workpiece holding face 12 and the external peripheral face of the carrying head 11a such that it tilts toward the rear end of the carrying head 11a.

A cylindrical nozzle 21a is mounted on the carrying head 11a such that it projects from the bottom face 16a and the cylindrical nozzle 21a is mounted on the carrying head 11a by fitting a shaft portion 22 integral with the cylindrical nozzle 21a into a mounting hole 23 formed in the carrying head 11a. The cylindrical nozzle 21a has a larger diameter than the shaft portion 22 and its rear face opposes the bottom face 16a and a slit 24 for discharging air is formed into a ring-like form between the rear face of the outer periphery of the cylindrical nozzle 21a and the bottom face 16a. A ring-like air pocket 25 is formed inside in the diameter direction with respect to the slit 24 in the rear face of the cylindrical nozzle 21a and a piping port 26 is formed in the carrying head 11a such that it is open to the mounting face 13. The piping port 26 communicates with the air pocket 25 through plural flow passages 27 open to the bottom face 16a. Therefore, if compressed air is supplied to the piping port 26 from outside as positive pressure air, the compressed air enter the air pocket 25 through the plural flow passages 27 and after that, is discharged toward the air guide face 17 through the slit 24.

The compressed air discharged from the slit 24 flows radially outward in the diameter direction in conditions that it never departs form the air guide face 17, sticking thereto and reaches the workpiece holding face 12. After that, it flows to the rear side of the carrying head 11a guided by the tapered face 18. Due to airflow along the front end face of the carrying head 11a, air flows in toward the front end face of the carrying head 11a from a direction of extension of the front end portion, so that negative pressure condition is created in front of the front end face of the carrying head 11a.

Therefore, if compressed air is discharged from the slit 24 with the carrying head 11a disposed above a sheet-like carried object such that the front end face opposes the carried object, negative pressure condition is created in front of the carrying head 11a by airflow along the surface of the carried object, sticking to the front end face of the carrying head 11a. Then, the carried object is sucked to the carrying head 11a such that it floats up and approaches the workpiece holding face 12.

A vertical hole 31a, which is open substantially in a vertical direction to the carried object, and a flat portion 31b perpendicular to the vertical hole 31a are formed in the cylindrical nozzle 21a. The central portion of the cylindrical nozzle 21a serves as a vertical nozzle 32. A flat portion 31b of the vertical nozzle 32 is substantially flat, forming a substantially same plane as the workpiece holding face 12. The piping port 33 is formed in the carrying head 11a such that it is open to the mounting face 13 and this piping port 33 communicates with the mounting hole 23 through the flow passage 34 and this mounting hole 23 communicates with the vertical hole 31a. Therefore, if compressed air is supplied form the piping port 33 as positive pressure air, the compressed air is spouted to the carried object from the vertical nozzle 32, and if vacuum is supplied from the piping port 33 as negative pressure air, air flows into the vertical nozzle 32 from outside.

The carrying style for the carried object by means of the carrying unit 10a includes a style in which the carrying head 11a is disposed facing downward and the carried object is carried in a hanging condition and a style in which the carrying head 11a is disposed facing upward and the carried object is carried in conditions that it is supported from down by the carrying head 11a. Each carrying style includes a style in which the carried object is carried in a non-contact condition to the front end face of the carrying head 11a via air layer and a style in which it is carried in a contact condition.

FIGS. 5A to 5D are schematic views showing a style in which the carrying head 11a is disposed facing downward so as to carry the carried object W. Pipes 37, 38 equipped with opening/closing valves 35, 36 are connected to the piping ports 26, 33 and in cases shown in FIGS. 5A to 5C, a positive pressure pump 41 for supplying compressed air is connected to the pipes 37, 38 respectively. Contrary to this, in case shown in FIG. 5D, a positive pressure pump 41 is connected to the pipe 37 connected to the piping port 26 while a vacuum pump 42 for supplying negative pressure air is connected to the pipe 38 connected to the piping port 33. In the meantime, the respective opening/closing valves 35, 36 automatically operate corresponding to a signal from a control unit (not shown).

In case shown in FIG. 5A, if the opening/closing valve 35 is opened to supply the compressed air to the piping port 26 and the compressed air is discharged from the slit 24, the discharged compressed air flows radially outward in the diameter direction without departing from the air guide face 17, sticking thereto, whereby forming air layer over the front end face of the carrying head 11a. Consequently, negative pressure condition is created in front of the front end face of the carrying head 11a by airflow from the direction of extension of the front end portion toward the front end face of the carrying head 11a and thus, if the carrying head 11a is brought near to the carried object W, the carried object W is sucked by the carrying head 11a such that it floats upward, thereby approaching the workpiece holding face 12.

The carried object W is sucked via the air layer flowing radially sticking to the front end face of the carrying head 11a, and if the compressed air is spouted from the vertical hole 31a by opening the opening/closing valve 36 in conditions that the carried object W is sucked, the spouted air flows radially to the outer periphery so that it flows along the carried object W, whereby the holding force for the carried object W being raised. Further more, because air layer is formed in the flat portion 31b of the cylindrical nozzle 21a by air spouted from the vertical hole 31a, even if the carried object is a sheet-like object easy to deform, it can be carried such that it is held substantially in a flat condition, while the deformation amount of the carried object W being suppressed.

In case to carry the carried object W by discharging the compressed air both from the slit 24 and the vertical hole 31a as shown in FIG. 5A, the carried object W is brought up to the carrying head 11a and after the suction action is executed, the compressed air is discharged from the vertical hole 31a, as described above.

In case shown in FIG. 5B, after the carried object W is sucked by the carrying head 11a with the same means as shown in FIG. 5A, the opening/closing valve 36 is opened and then the opening/closing valve 35 is closed to discharge the compressed air from the vertical hole 31a without discharging the compressed air from the slit 24. Consequently, air discharged from the vertical hole 31a flows between the front end face of the carrying head 11a and the carried object W, so that the carried object W is brought in a non-contact condition by air layer formed of air discharged from the vertical hole 31a and held by the carrying head 11a. If after the carried object W is attracted by the carrying head 11a, air layer is formed of air discharged from the vertical hole 31a and the carried object W is kept in the non-contact condition, the air consumption of the carrying head 11a can be reduced.

FIG. 5C is a diagram showing a dropping means of the carried object W when loading the carried object W, after carried through the suction process and transportation process of FIG. 5A or 5B, on a predetermined place. To drop the carried object W after carried in the carrying style shown in FIG. 5A, first, the opening/closing valve 35 is closed to stop discharge of the compressed air from the slit 24 and after that, the opening/closing valve 36 is opened and closed intermittently, the carried object W is dropped with the compressed air spouted from the vertical nozzle 31a. By discharging air intermittently like pulses without discharging air continuously from the vertical nozzle 32, the carried object W can be dropped quickly without dropping by its own weight. To drop the carried object W after it is carried in the carrying style shown in FIG. 5B, the carried object W is allowed to drop slightly by its own weight by once closing the opening/closing valve 36 and after that, the opening/closing valve 36 is opened and closed intermittently again so as to discharge the compressed air intermittently from the vertical nozzle 32, whereby making it possible to drop the carried object W quickly.

In case shown in FIG. 5D, the opening/closing valve 36 is closed and the opening/closing valve 35 is opened to supply compressed air to the piping port 26 to make the carrying head 11a suck the carried object W by floating. After the carried object W is sucked by the carrying head 11a, the opening/closing valve 36 is opened while the opening/closing valve 35 is closed to supply vacuum to the vertical hole 31a without discharging the compressed air from the slit 24. Consequently, the carried object W is fitted to the front end face of the carrying head 11a by external air invading into the vertical hole 31a. Consequently, it comes that the carried object W is held and carried in conditions that it keeps contact with the carrying head 11a, and the vertical nozzle 32 functions as a sucking pad. In the meantime, the opening/closing valve 36 may be kept open from the beginning.

Although the carrying unit 10a shown in FIGS. 1 to 5 is constituted of only a single carrying head 11a, a carried object of a larger size can be carried by installing plural carrying heads 11a on a holder plate.

Figure 6:
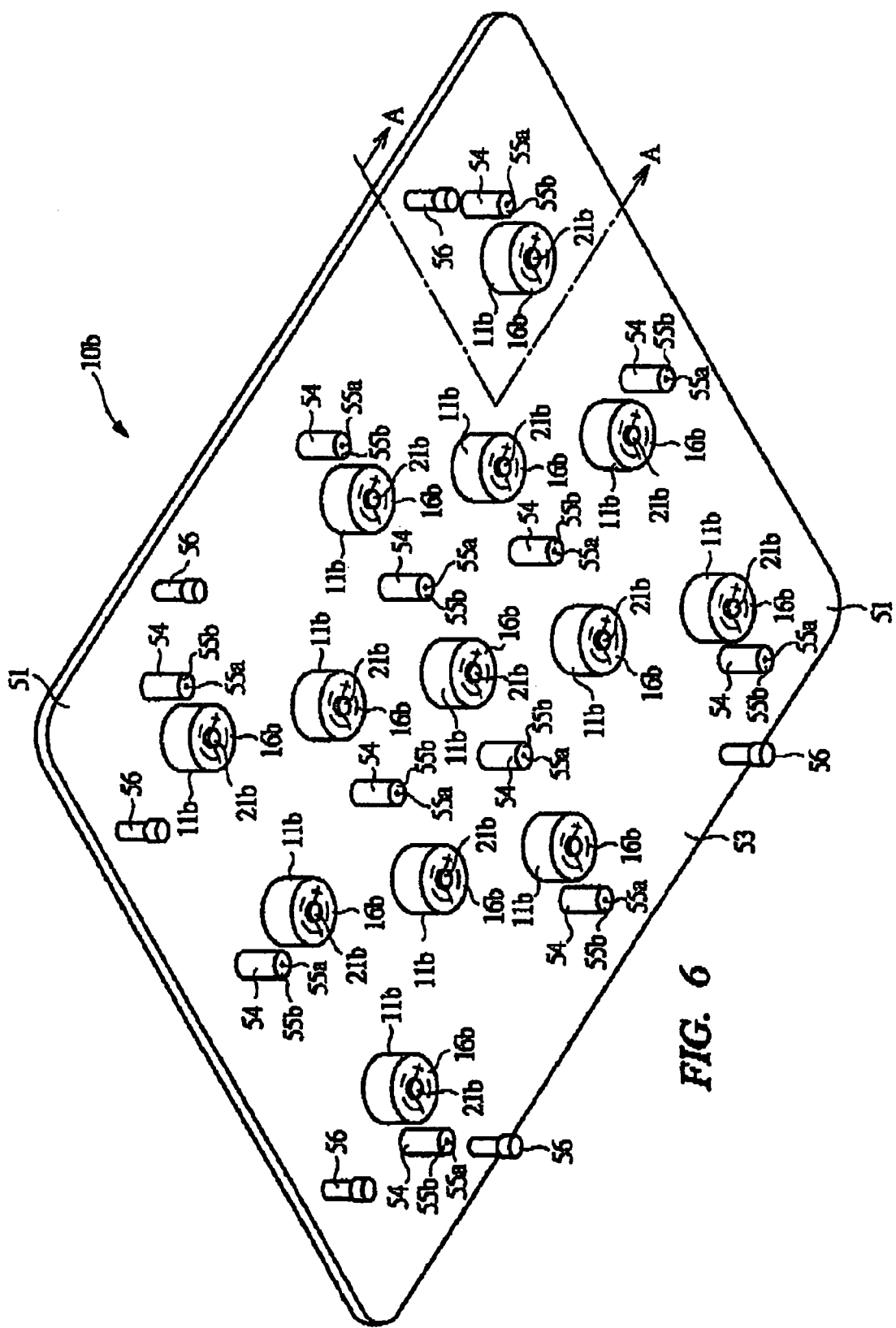
FIG. 6 is a perspective view showing other carrying unit according to an embodiment of the present invention.
Figure 7:
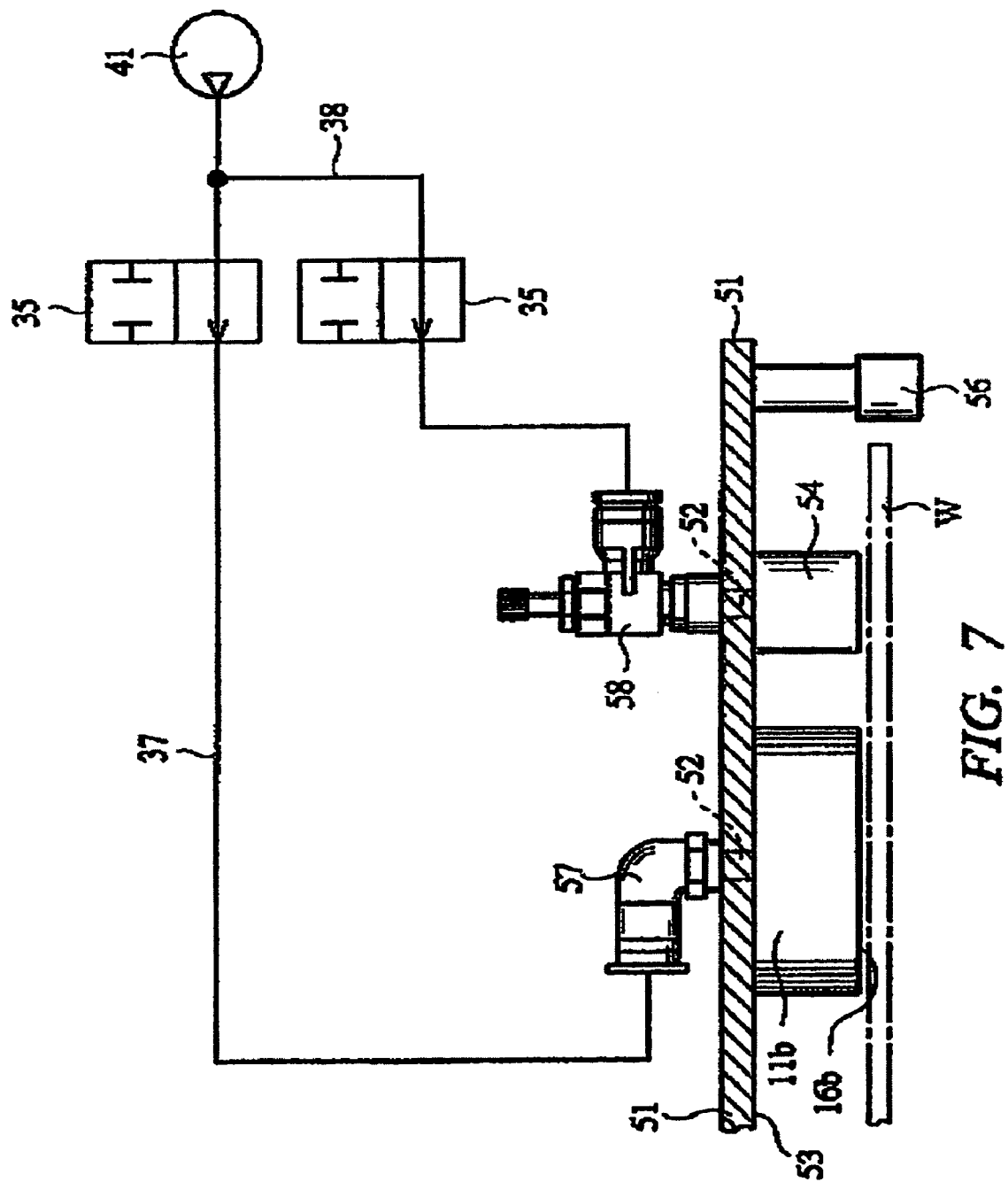
FIG. 7 is a sectional view taken along the line A-A of FIG. 6.

FIG. 6 is a perspective view showing a carrying unit 10b according to other embodiment of the present invention and FIG. 7 is a sectional view taken along the line A-A of FIG. 6. By attaching the same reference numerals to common components to the members shown in FIGS. 1 to 5 for FIGS. 6 and 7, detailed description thereof is omitted.

The carrying unit 10b has a holder plate 51 disposed opposing the carried object and plural through holes 52 are formed at a predetermined interval in that holder plate 51 (see FIG. 7). As shown in FIG. 6, an opposed face 53 of the holder plate 51 opposing to the carried object W, plural carrying heads 11b are fixed on the holder plate 51 corresponding to each of the respective through holes 52 and a cylindrical nozzle 21b is attached to each of the carrying heads 11b such that it projects from a bottom face 16b.

The carrying unit 10b has no vertical hole in the center of the cylindrical nozzle 21b and no vertical nozzle is provided in the cylindrical nozzle 21b. A plurality of vertical nozzles 54 in each of which a vertical hole 55a and a flat portion 55b at the right angle to the vertical hole 55a are formed are attached to the through holes 52 formed in the holder plate 51 separately from the carrying head 11b. Each of those vertical nozzles 54 is set to substantially the same length as the dimension in the axial direction of the carrying head 11b provided with the cylindrical nozzle 21b, and a vertical hole 55a opens substantially in the vertical direction to the carried object W for supplying positive pressure or negative pressure air to the carried object is formed. Guide pins 56 are fixed vertically on an edge portion of the holder plate 51 at a predetermined interval, and when the holder plate 51 is brought near to a workpiece supporting portion (not shown) in which a workpiece W before transportation by sucking is disposed, the guide pins 56 make contact with the workpiece supporting portion to limit moving thereof in the tangential direction.

Plural joints 57 to be connected to the carrying head 11b and plural joints 58 to be connected to the vertical nozzles 54 are mounted on the holder plate 51, and those joints 57, 58 are disposed on an opposite side to the opposing face 53 of the holder plate 51 respectively. Pipes 37, 38 to be connected to a positive pressure pump 41 are connected respectively to those joints 57, 58, so that compressed airflow through the pipes 37, 38 flows to slits in the cylindrical nozzles 21b and the vertical holes 55a in the vertical nozzles 54 through the joints 57, 58.

In the carrying unit 10b shown in FIGS. 6 and 7, a carried object can be carried in the carrying style shown in FIGS. 5A to 5D with the carrying head 11b facing downward. For example, by creating negative pressure condition in front of the opposing face 53 of the holder plate 51 by discharging compressed air from the cylindrical nozzle 21b respectively, even a carried object W of a large size can be sucked to approach the holder plate 51. After that, by driving a moving member (not shown) attached to the holder plate 51 with compressed air discharged form the vertical nozzles 54, the carried object W can be carried to a predetermined position in the non-contact condition. Such a carrying unit 10b is also capable of carrying plural carried objects of a small size in the non-contact condition all at once. This carrying unit 10b is also capable of carrying a carried object w in a sucked condition by connecting the vacuum pump 42 of the carrying unit 10b to the pipe 38 and then supplying negative pressure air to the vertical hole 55a.

However, it is needless to say that the present invention is not limited to the foregoing embodiments, and various modifications and alterations can be made within the scope of the present invention. For example, as above-described in the embodiments, the compressed air is discharged, but it is acceptable to provide other positive pressure gasses such as inert gasses to the cylindrical nozzles in order to generate the suction holding force. Further, it is also acceptable to release such gasses to the air instead of providing positive or negative pressure gasses to the piping ports 33.

What is claimed is:

1. A non-contact carrying unit comprising:
    a carrying head, in which a workpiece holding face opposing a carried object and a concave portion dented to the side of a rear end with respect to the workpiece holding face are formed, and which carries and holds the carried object in a nearly flat condition, the concave portion having a bottom face and an air guide face continued gently from the bottom face to the workpiece holding face;
    a cylindrical nozzle attached to the carrying head such that it projects from the bottom face of the concave portion so as to form a ring-like air discharging slit between the bottom face and the cylindrical nozzle, to discharge positive pressure air from the ring-like slit; and
    a vertical nozzle having a vertical hole opened substantially in the vertical direction with respect to the carried object in order to supply positive or negative pressure air to the carried object, and having a flat portion perpendicular to the vertical hole, the flat portion forming a same plane as the workpiece holding face, and a central portion of the cylindrical nozzle serving as the vertical nozzle,
    wherein, with the carrying head disposed above the carried object such that the workpiece holding face opposes the carried object, the carried object is carried in conditions that it is held via airflow between the carrying head and the carried object, by discharging positive pressure air from the slit to suck and attract the carried object toward the workpiece holding face and thereafter discharging positive pressure air from the vertical hole.

2. The non-contact carrying unit according to claim 1 wherein the slit discharges positive pressure air toward the air guide face.

3. The non-contact carrying unit according to claim 2, wherein the airflow between the carrying head and the carried object is formed between the workpiece holding face and the carried object and between the flat portion and the carried object.

4. The non-contact carrying unit according to claim 2, wherein the airflow between the carrying head and the carried object is formed between the flat portion and the carried object, by discharging positive pressure air from the slit to suck and attract the carried object toward the workpiece holding face and thereafter supplying positive pressure air to the vertical hole while stopping the discharge of the positive pressure air from the slit.

5. The non-contact carrying unit according to claim 1, wherein a plurality of the carrying heads are provided on a holder plate and a plurality of the vertical nozzles are provided on the holder plate.

6. The non-contact carrying unit according to claim 1, wherein the airflow between the carrying head and the carried object is formed between the workpiece holding face and the carried object and between the flat portion and the carried object.

7. The non-contact carrying unit according to claim 1, wherein the airflow between the carrying head and the carried object is formed between the flat portion and the carried object, by discharging positive pressure air from the slit to suck and attract the carried object toward the workpiece holding face and thereafter supplying positive pressure air to the vertical hole while stopping the discharge of the positive pressure air from the slit.

8. The non-contact carrying unit according to claim 1, wherein, after the carried object is carried by the carrying head, the carried object is dropped by stopping supply of positive pressure air from the slit while discharging positive pressure air from the vertical hole.

9. A non-contact carrying unit comprising:
    a carrying head, in which a workpiece holding face opposing a carried object and a concave portion dented to the side of a rear end with respect to the workpiece holding face are formed, and which carries and holds the carried object in a nearly flat condition, the concave portion having an air guide face continued gently from the bottom face to the workpiece holding face;
    a cylindrical nozzle attached to the carrying head such that it projects from the bottom face of the concave portion so as to form a ring-like air discharging slit between the bottom face and the cylindrical nozzle, to discharge positive pressure air from the ring-like slit; and a vertical nozzle having a vertical hole opened substantially in the vertical direction with respect to the carried object in order to supply positive or negative pressure air to the carried object, and having a flat portion perpendicular to the vertical hole, the flat portion forming a same plane as the workpiece holding face, and a central portion of the cylindrical nozzle serving as the vertical nozzle, wherein, with the carrying head disposed above the carried object such that the workpiece holding face opposes the carried object, the carried object is carried in conditions that it is held by the workpiece holding face by suction, by discharging positive pressure air from the slit to suck and attract the carried object toward the workpiece holding face and thereafter supplying negative pressure air to the vertical hole while stopping the discharge of the positive pressure air from the slit.

10. The non-contact carrying unit according to claim 9, wherein the slit discharges positive pressure air toward the air guide face.

11. The non-contact carrying unit according to claim 10, wherein, after the carried object is carried by the carrying head, the carried object is dropped by stopping supply of positive pressure air from the slit while discharging positive pressure air from the vertical hole.

* * * * *

UNITED STATES PATENT AND TRADEMARK OFFICE
CERTIFICATE OF CORRECTION

PATENT NO. : 7,597,370 B2  
APPLICATION NO. : 11/319126  
DATED : October 6, 2009  
INVENTOR(S) : Toshikazu Tanae and Yukio Kaneko It is certified that error appears in the above-identified patent and that said Letters Patent is hereby corrected as shown below:

On the Title Pg Item (73)  
The correct Assignee information should read as follows:

Koganei Corporation, Tokyo (JP)

Signed and Sealed this

First Day of December, 2009

David J. Kappos  
*Director of the United States Patent and Trademark Office*